United States Patent
Höök et al.

(10) Patent No.: US 10,794,816 B2
(45) Date of Patent: Oct. 6, 2020

(54) METHOD FOR DETERMINING A HYDRODYNAMIC SIZE OF AN OBJECT

(71) Applicant: GOTHENBURG SENSOR DEVICES AB, Gothenburg (SE)

(72) Inventors: Fredrik Höök, Alingsås (SE); Stephan Block, Billdal (SE); Björn Johansson Fast, Billdal (SE); Anders Lundgren, Varberg (SE)

(73) Assignee: GOTHENBURG SENSOR DEVICES AB, Gothenburg (SE)

( * ) Notice: Subject to any disclaimer, the term of this patent is extended or adjusted under 35 U.S.C. 154(b) by 15 days.

(21) Appl. No.: 15/780,695

(22) PCT Filed: Dec. 2, 2016

(86) PCT No.: PCT/EP2016/079552
§ 371 (c)(1),
(2) Date: Jun. 1, 2018

(87) PCT Pub. No.: WO2017/093466
PCT Pub. Date: Jun. 8, 2017

(65) Prior Publication Data
US 2018/0356332 A1    Dec. 13, 2018

(30) Foreign Application Priority Data
Dec. 2, 2015    (SE) ...................... 1551581

(51) Int. Cl.
*G01N 15/14*    (2006.01)
*B01L 3/00*    (2006.01)
(Continued)

(52) U.S. Cl.
CPC ...... *G01N 15/1456* (2013.01); *B01L 3/50273* (2013.01); *B01L 2400/0463* (2013.01);
(Continued)

(58) Field of Classification Search
CPC ....... G01N 15/1456; G01N 2015/1493; G01N 2015/0065; G01N 2015/1006;
(Continued)

(56) References Cited

U.S. PATENT DOCUMENTS 7,012,250 B1 *   3/2006   Aksyuk ............... H01J 49/0018
                                                  250/281
7,168,296 B2 *   1/2007   Tipler ................ G01N 15/0826
                                                  73/23.35
(Continued)

FOREIGN PATENT DOCUMENTS

WO    WO-2003/093801 A1    11/2003
WO    WO-2013/021185 A1    2/2013
(Continued)

OTHER PUBLICATIONS

Achterberg, Chap. 9 "Theory of diffusion and Viscosity" from "Diffusion Processes", May 9, 2014, retrieved from https://www.astro.rug.nl/~weygaert/tim1publication/astrohydro2014/achterberg.ngsa.diffusion_viscosity.pdf.*
(Continued)

*Primary Examiner* — Mohamed K Amara
(74) *Attorney, Agent, or Firm* — Ballard Spahr LLP

(57) ABSTRACT

The disclosure relates to a method for determining a hydrodynamic size of an object, such as a nano-sized object, said method comprising the steps of: —providing a fluid interface, —linking said object to said fluid interface thereby providing a linked object, whereby the movement of said linked object is restricted by virtue of being linked to said fluid interface, —providing and determining a hydrodynamic shear force that acts on said linked object, —tracking the movement of said linked object, and —calculating the hydrodynamic size of the object using the Einstein-Smoluchowski relation.

16 Claims, 12 Drawing Sheets

(51) Int. Cl.
*G01N 15/00* (2006.01)
*G01N 15/10* (2006.01)

(52) U.S. Cl.
CPC .............. *G01N 2015/0065* (2013.01); *G01N 2015/1006* (2013.01); *G01N 2015/1087* (2013.01); *G01N 2015/1493* (2013.01)

(58) Field of Classification Search
CPC ......... G01N 2015/1087; B01L 3/50273; B01L 2400/0463
See application file for complete search history.

(56) References Cited

U.S. PATENT DOCUMENTS

| | | | | |
|---|---|---|---|---|
| 7,273,995 | B1* | 9/2007 | Manz | H05H 1/48 219/121.43 |
| 7,424,366 | B2* | 9/2008 | Angelescu | E21B 47/1015 702/12 |
| 7,502,109 | B2* | 3/2009 | Bonne | G01F 1/6845 356/328 |
| 7,513,171 | B2* | 4/2009 | Coyle | G01N 1/4022 73/863.21 |
| 9,423,447 | B2* | 8/2016 | Kiermasz | G01N 5/02 |
| 10,048,234 | B2* | 8/2018 | Andreucci | G01N 33/225 |
| 10,393,711 | B2* | 8/2019 | Nettesheim | G01N 27/04 |
| 2002/0165103 | A1* | 11/2002 | Tsaur | A61K 8/73 510/130 |
| 2004/0169903 | A1 | 9/2004 | Kreuzer et al. | |
| 2005/0063865 | A1* | 3/2005 | Bonne | B82Y 15/00 422/68.1 |
| 2005/0141999 | A1* | 6/2005 | Bonne | B82Y 10/00 417/48 |
| 2005/0183208 | A1* | 8/2005 | Scheper | D06F 25/00 8/142 |
| 2006/0131236 | A1* | 6/2006 | Belfort | B01D 61/145 210/650 |
| 2008/0160630 | A1* | 7/2008 | Liu | G01N 21/76 436/164 |
| 2010/0330605 | A1* | 12/2010 | Rendu | G01N 27/07 435/29 |
| 2011/0020459 | A1* | 1/2011 | Achrol | A61K 35/12 424/520 |
| 2012/0141551 | A1 | 6/2012 | Bloembergen et al. | |
| 2013/0196347 | A1 | 8/2013 | Turkcan et al. | |
| 2013/0288232 | A1 | 10/2013 | Duhr et al. | |
| 2014/0333935 | A1 | 11/2014 | Grier et al. | |
| 2015/0075987 | A1 | 3/2015 | Tasci et al. | |
| 2015/0147244 | A1* | 5/2015 | Cross | B01J 19/0053 422/310 |

FOREIGN PATENT DOCUMENTS

| | | |
|---|---|---|
| WO | WO-2014/207089 A1 | 12/2014 |
| WO | WO-2015/143467 A1 | 10/2015 |

OTHER PUBLICATIONS

Benkoski, J.J. et al., Lateral Mobility of Tethered Vesicle-DNA Assemblies. J Phys Chem B. 2005; 109(9):9773-9.

Simonsson, L. et al., Site-Specific DNA-Controlled Fusion of Single Lipid Vesicles to Supported Lipid Bilayers. ChemPhysChem. 2010; 11(5):1011-7.

International Preliminary Report on Patentability dated Jun. 5, 2018 by the International Searching Authority for Patent Application No. PCT/EP2016/079552, which was filed on Dec. 2, 2016 and published as WO 2017/093466 on Jun. 8, 2017 (Inventor—Höök et al.; Applicant—Gothenburg Sensor Devices) (8 pages).

Block, S. et al., Two-Dimensional Flow Nanometry of Biological Nonparticles for Accurate Determination of Their Size and Emission Intensity. Nat Commun. 2016; 7:12956 (8 pages).

Haiden, C. et al., Sizing of Metallic Nanoparticles Confined to a Microfluidic Film Applying Dark-Field Particle Tracking. Langmuir. 2014; 30:9607-15.

Pospichalova, V. et al., Simplified Protocol for Flow Cytometry Analysis of Fluorescently Labeled Exosomes and Microvesicles Using Dedicated Flow Cytometer. J Extracell Vesicl. 2015; 4:25530.

Wattenbarger, M.R. et al., Specific Adhesion of Glycophorin Liposomes to a Lectin Surface in Shear Flow. Biophys J Biophys Soc. 1990; 57:765-77.

Yoshina-Ishii, C. and Boxer, S.G., Controlling Two-Dimensional Tethered Vesicle Motion Using an Electric Field: Interplay of Electrophoresis and Electro-Osmosis. Langmuir. 2006; 22(5):2384-91.

Yoshina-Ishii, C. et al., Diffusive Dynamics of Vesicles Tethered to a Fluid Supported Bilayer by Single-Particle Tracking. Langmuir. 2006; 22(13):5682-9.

International Search Report and Written Opinion dated Feb. 22, 2017 by the International Searching Authority for Patent Application No. PCT/EP2016/079552, which was filed on Dec. 2, 2016 and published as WO 2017/093466 on Jun. 8, 2017 (Inventor—Höök et al.; Applicant—Gothenburg Sensor Devices AB) (12 pages).

* cited by examiner ial Application No. PCT/EP2016/079552, filed Dec. 2, 2016, which claims the benefit of Swedish Patent Application No. 1551581-0, filed Dec. 2, 2015, each of which are incorporated herein by reference in their entirety.

METHOD FOR DETERMINING A HYDRODYNAMIC SIZE OF AN OBJECT

This application is a U.S. National Phase Application of International Application No. PCT/EP2016/079552, filed Dec. 2, 2016, which claims the benefit of Swedish Patent Application No. 1551581-0, filed Dec. 2, 2015, each of which are incorporated herein by reference in their entirety.

TECHNICAL FIELD

The present disclosure relates to a method for determining a hydrodynamic size of an object, such as a nano-sized object. Further, the present disclosure relates to the use of a system comprising a container, means for providing a fluid interface within said container, means providing and determining a hydrodynamic shear force that acts on an object linked to said fluid interface, and means for tracking an object linked to said fluid interface, for determining a hydrodynamic size of an object such as a nano-sized object.

BACKGROUND

Consumer's needs and industrial trends prompt the development of object characterization in many diverse fields such as biological research, medical diagnostics, sensor technology and 3D printing. The objects may be particles the choice of which depends on the selected technical field and application. For instance, the objects may be metal particles, ceramic particles, cells, viruses, lipid assemblies etc. The size of the object undergoing investigation may vary and includes objects having a size in the micrometer range (i.e. up to 100 μm) and/or in the nanometer range (i.e. up to 500 nm).

It is frequently desirable to sort objects in order to enable further study and/or use of said object. To achieve this, the objects need to be characterized with respect to parameters of relevance for the application being investigated.

The object characterization may be based on various techniques such as fluorescence intensity and light scattering. For instance, fluorescence-activated cell sorting (FACS) has successfully been used in flow cytometry enabling detailed investigations of cell population heterogeneity. As a consequence, FACS has had a tremendous impact on various fields like immunology, haematology, pharmacology, or biological basic research as well as medical diagnostics. Unfortunately, however, the FACS technology is restricted to cells having a size in the micrometer range and reports of FACS-based sorting of single nanometer sized objects like viruses, exosomes, or liposomes are so far lacking.

The Journal of extracellular vesicles, 4, 2015, article number 25530, Pospichalova et al., discloses typical problems in flow cytometry and shows that it is extremely challenging to study whole exosome populations.

One of the most important parameters to determine is object size since it is linked to the object's physical, chemical and/or biological properties. The size may be measured as the core size or the hydrodynamic size. Unfortunately, object size determination is often difficult or inconvenient. This is especially true for small objects such as objects in the nanometer size range.

In addition to diminished signals from minute objects, an important reason why object size determination for small objects is difficult is the requirement for high flow rates as explained below in the context of cytometric sorting.

Cytometric sorting requires flow rates that are sufficiently large for the hydrodynamic movement (induced by the flow) to exceed the random/Brownian motion of the object, since it would otherwise not be possible to control the directed movement of the object required in the sorting step. A measure for the random motion is given by the object's diffusion coefficient, D, which for spherical objects follows the so-called Stokes-Einstein-relation that connects D with the Boltzmann constant $k_B$, absolute temperature T, dynamic viscosity $\eta$ and the object's hydrodynamic radius R:

$$D = \frac{k_B \cdot T}{6\pi \cdot \eta \cdot R}. \tag{1}$$

Equation 1 (Eq.1), which is the Stokes-Einstein equation for diffusion of spherical objects through a liquid with low Reynolds number, shows that the random motion increases with decreasing object size R, which implies that the flow rate must be increased if one intends to reduce the lower size limit of sortable objects. A direct consequence of a higher flow rate is a decrease in the transit time of the objects through the readout/characterization volume, which leads to a reduction in the effective measurement time and thereby the magnitude of the detected signals. These effects make it difficult for bulk-based flow cytometry to sort objects that are below 0.5 μm, which is often cited as a lower size limit for high fidelity sorting of objects in commercial flow cytometers. This limitation has severe practical implications since a multitude of nanoscopic objects (i.e. objects having a size of 1-100 nm) appear as heterogeneous mixtures. For instance, viruses, extracellular vesicles and exosomes as well as native and synthetic liposomes would tremendously benefit from single object sorting capabilities as they are often heterogeneous with respect to size which complicates the analysis of their biological function (e.g. exosomes and viruses) or applicability e.g. liposomes aiming for target drug delivery.

WO 03/093801 discloses a single particle tracking approach, known as nanoparticle tracking analysis (NTA). The object size is determined by application of the Stokes-Einstein-relation on the bulk diffusion coefficient, which is extracted from 3D trajectories (see claim 14 of WO 03/093801).

WO 2013/021185 describes a combination of NTA with dynamic light scattering, mainly extending the range of resolvable particle sizes to the μm-scale.

US 2004/0169903 and US 2014/0333935 describe particle size determination which enhances the accuracy in position determination by using holographic video microscopy.

The documents above all rely on the Stokes-Einstein relation and their methods comprise the step of suspending the objects in a fluid so that they may move in three dimensions. As explained herein, this makes size measurement of small objects difficult.

Langmuir, 2006, Vol. 22, pp. 2384-2391 discloses tethering of unilamellar vesicles to a supported two-dimensional fluid bilayer within a microfluidic channel, followed by hydrodynamic or electrophoretic manipulation of the vesicle position. Sorting and/or measurement of hydrodynamic size of the tethered vesicles is not mentioned.

Thus, there remains a need for alternative methods for measuring object size.

It is an aim of the present disclosure to provide a method fulfilling said need.

SUMMARY

The above-mentioned aim is achieved by a method for determining a hydrodynamic size of an object, such as a nano-sized object, said method comprising the steps of:
providing a fluid interface,
linking said object to said fluid interface thereby providing a linked object, whereby the movement of said linked object is restricted by virtue of it being linked to said fluid interface,
providing and determining a magnitude of a hydrodynamic shear force that acts on said linked object, and
tracking the movement of said linked object.

There is also provided a system for determining a hydrodynamic size of an object such as a nano-sized object comprising or consisting of:
a container,
means for providing a fluid interface within said container,
means providing a hydrodynamic shear force that acts on an object linked to said fluid interface, and
means for tracking an object linked to said fluid interface.

DESCRIPTION

In accordance with the present disclosure, there is provided a method for determining a hydrodynamic size of an object, such as a nano-sized object, said method comprising the steps of:
providing a fluid interface,
linking said object to said fluid interface thereby providing a linked object, whereby the movement of said linked object is restricted by virtue of it being linked to said fluid interface,
providing and determining a magnitude of a hydrodynamic shear force that acts on said linked object, and
tracking the movement of said linked object.

There is also provided a system for determining a hydrodynamic size of an object such as a nano-sized object comprising or consisting of:
a container,
means for providing a fluid interface within said container,
means providing a hydrodynamic shear force that acts on an object linked to said fluid interface, and
means for tracking an object linked to said fluid interface.

The container may be a container for a microfluidic channel. The object may as described herein. For instance, the object may comprises or consist of a metal, an organic material, an inorganic material, a biological material and any combination thereof. The biological material may be selected from the group consisting of one or moreproteins, viruses, exosomes, lipid assemblies, nucleic acids, extracellular vesicles and any combination thereof.

There is also provided the use of a system comprising or consisting of:
a container,
means for providing a fluid interface within said container,
means providing a hydrodynamic shear force that acts on an object linked to said fluid interface, and
means for tracking an object linked to said fluid interface for determining a hydrodynamic size of an object such as a nano-sized object.

The container may be a container for a microfluidic channel.

As a result of linking the object to the fluid interface, the movement of the linked object will be restricted. For example, the movement may be restricted into a two-dimensional plane. This may be the case when the fluid interface is planar. The two dimensions of the two-dimensional plane may extend in x and y directions (x, y).

The present disclosure is based on the unexpected finding that the size of an object, such as a hydrodynamic size, may be determined by linking an object to a fluid interface thereby reducing the diffusion coefficient and the random motion of the resulting linked object. Thus, in contrast to approaches like nanoparticle tracking analysis (NTA) object size determination cannot be based on random motion and it is therefore unpredictable how to accomplish object size determination and/or sorting. Instead, the present disclosure uses determination, i.e. by measurement and/or calculating, of the linked object's diffusivity and velocity to enable determination of a hydrodynamic shear force, and consequently the object's hydrodynamic size. The velocity of the object may be induced by the flow of a fluid, such as a liquid. As explained herein, as the linked object's diffusion coefficient and velocity both depend on the mobile properties of the linker(s), the linker mobility drops out in the calculation of the hydrodynamic shear force (which is proportional to the ratio of object's velocity and diffusion coefficient).

Advantageously, the high flow rates required in conventional measurements involving objects moving randomly in three dimensions are avoided in the method and/or use of the present disclosure thereby facilitating tracking of the linked objects.

The lower diffusion coefficient of objects linked to a fluid interface compared to objects that may move freely in three dimensions is believed to be due to the fact that parts of the linkers that are embedded in the fluid interface experience a much higher friction within the fluid interface than the friction experienced by the linked objects in a liquid surrounding said objects. Hence, linking objects to a fluid interface results in a decrease the diffusion coefficient by several orders of magnitude below its bulk value (Eq. 1, vide supra), which fulfils one requirement needed to push sorting into the nm-scale. On the other hand, the diffusivity of objects linked to a fluid interface does not obey Eq. 1 but is rather determined by the diffusivity of the fluid interface and the number of linkers to the membrane. Hence, the size of the linked object cannot be determined from their diffusivity alone.

In the method and/or use described herein the hydrodynamic force may be provided in various ways. For instance, it may be provided by electrophoretic means, osmotic means, magnetic means, convection, by inducing a flow and any combinations thereof.

The method and/or use described herein may further comprise a step of:
determining said hydrodynamic shear force acting on said object, thereby allowing for determination of said hydrodynamic size of said linked object. Determination of said hydrodynamic shear force acting on said object may involve measurement of said object's diffusion coefficient and velocity. Thus, there is provided a method and/or use further comprising a step of:
determining said hydrodynamic shear force acting on said object by measuring and/or determining said object's diffusion coefficient and velocity, thereby allowing for determination of said hydrodynamic size of said linked object.

The object described herein may be made of any material or any combination of materials. For instance, the objects may be homogenous, i.e. consist of a single material or a single material mixture. However, the object may also be heterogeneous, i.e. consist of several materials. For example, the object may have a core of one material and a sheath of another material.

As an example, the object may comprise or consist of a metal, an organic material, an inorganic material, a biological material or any combination thereof. The metal may be any metal, such as gold, copper, magnesium, any combination thereof and/or any oxide, nitride or carbide thereof. The inorganic material may be a ceramic. The ceramic may be any ceramic such as a ceramic comprising silicon, zirconium, aluminium and/or any oxide, nitride or carbide thereof. The biological material may comprise or consist of one or more proteins, lipids, viruses, exosomes, liposomes and any combination thereof.

The object to be linked to the fluid interface may be suspended or dissolved in a solvent. The choice of solvent will depend on the object. For example, metal particles may be suspended in an aqueous solution. In a further example, a biological material such as a virus may be suspended or dissolved in a bodily fluid such as blood or an artificially prepared physiological solution. Alternatively, the object to be linked to the fluid surface may be added neat, i.e. without being suspended or dissolved in a solvent.

The objects described herein may have any shape. For instance, the objects may have a substantially spherical shape, an elongate shape or have a substantially irregular shape.

The object size referred to herein may be the core size of the object or the hydrodynamic size of the object. In this document, the hydrodynamic size of an object intends the size of the object including any solvation layer. Further, the object size refers to the largest cross-sectional size of the object. As an example, the objects described herein may have a size or size distribution in the micrometer range such as 0.5 micrometers or less. Alternatively, the objects may be nano-sized, i.e. they have a size in the nanometer range. In a further example, the objects described herein may have a size or size distribution in the nanometer range such as within the range of from about 1 nm to about 500 nm, from about 50 nm to about 250 nm, from about 200 nm to about 400 nm.

In particular, the expression "hydrodynamic size" is intended to mean the hydrodynamic radius of the object calculated using equation (1), whereby an object calculated using the method described herein is assumed to have a spherical shape with a radius that is equivalent to half the maximum transverse dimension of the object.

The object to be linked to the fluid interface may be uniform or non-uniform in size. Frequently, the object is non-uniform in size. When the object is non-uniform in size it may exhibit a size distribution range. For instance, the size distribution range may vary from about 1 nm to 500 nm, from 50 nm to 250 nm, from about 200 nm to about 400 nm.

The objects described herein may be particles such as nanoparticles.

The fluid interface described herein may be substantially planar or substantially curved. For instance, the fluid interface may be two-dimensional, i.e. it may extend in substantially two dimensions such as length and breadth or an (x, y) plane. A third dimension, such as a width, may be of negligible magnitude compared to the substantially two dimensions of the fluid interface. Examples of a fluid interface that may be used in the context of the present disclosure include a film, a monolayer, a bilayer, a cell membrane, an air water interface or an oil water interface.

The fluid interface may extend laterally on the micrometer scale or millimeter scale, while having an interface thickness of only few nanometers. The bilayer may be a lipid bilayer such as a supported lipid bilayer (SLB). The supported lipid bilayer may be associated with a support such as a wall.

Linking of the object to the fluid interface may take place using a linking strategy as described in the art. For instance, linking may take place as described in Journal of Physical Chemistry B, 109(19), 9773-9779 or as described in Langmuir, 22(13), 5682-5689. Suitably, linking should take place keeping in mind that the linked object should maintain a mobility that makes it possible to induce a directed motion of said objects by a flow surrounding said objects. It is envisaged to use any type of linkage to a lipid (e.g. cholesterol) or amphiphilic molecule (e.g. peptides or proteins) that associates to a lipid membrane to link the object to the membrane.

The fluid interface may be comprised within a vessel such as a microfluidic channel, i.e. a channel that is in the range of a micrometers. The microfluidic channel may have a width of 100 micrometers or less. The fluid interface may be located on a wall, such as an inner wall, of said microfluidic channel. The wall may be a bottom wall. The fluid interface may also be comprised within or located on to a macroscopic surface such as a cylindrical capillary. The fluid interface may be located on an inner wall of a cylindrical capillary. Further, the fluid interface may be located on a cell surface. The fluid interface may be arranged to allow for moving of said fluid interface relative to said wall. Alternatively, the fluid interface may be attached to said wall so that movement of said fluid interface relative to said wall is substantially prevented.

Upon inducing a flow in the microfluidic channel, the flow may be induced along one of the dimensions of the two-dimensional plane restricting the movement of the linked object described herein such as the x or y direction of said two-dimensional plane.

The method and/or use of the present disclosure allows for tracking of the object linked to the fluid interface. Since the linking results in a considerable lowering of the diffusion of the linked object the tracking may take place in real time, i.e. the detection instrument will operate in a way allowing for detection and analysis substantially simultaneously. Thus, the method and/or use of the present disclosure allows for tracking of the object linked to the fluid interface in real time. This may be particularly useful when the method and/or use described herein is used for sorting of objects such as nano-sized objects.

The detection instrument may be a microscope that is able to analyse the same number of frames as it is able to write per time unit. This is so because otherwise the tracked objects will sooner or later have passed the field of view of the microscope before their properties have been determined by the analysis, making a sorting based on their properties impossible. Detection may also be based on microscopic imaging (e.g. fluorescence or scattering imaging). Single Particle Tracking (SPT) may be used to extract object properties of interest (e.g. mobility, fluorescence and/or scattering imaging). As an example, the tracking of the method and/or use of the present disclosure may be SPT. The SPT may be performed in real time as described herein. In this document, the term "mobility" ($\mu$) intends the ratio of the object's terminal drift velocity $v_d$ to an applied force F, i.e. $\mu = v_d/F$.

The method and/or use of the present disclosure may be used in combination with a further method for detecting the linked object. The further method may involve one or more techniques selected from the group consisting of fluorescence, refractive index and scattering intensity.

Additionally, the method and/or use of the present disclosure may involve and/or be used for sorting the linked objects. Thus, the method described herein may be a method for sorting objects. The sorting may be based on the size such as the hydrodynamic size of the object and/or the one or more techniques in the further method described herein.

For instance, the method or use for sorting may be based on the measurement of the object's hydrodynamic size in combination with the object's fluorescence and/or scattering intensity. In this case, the sorting may be performed in analogy with conventional flow cytometry sorters and will present the advantage of being applicable to objects in the nanometer size range.

In a further example, the method and/or use for sorting described herein may be based on the object's fluorescence- or scattering intensity versus hydrodynamic size. This has the advantage that the hydrodynamic size can be determined independently from the fluorescence- or scattering intensity. Hence, it is possible to sort nanometer sized objects based on their fluorescence intensity density, which is obtained by dividing the measured fluorescence intensity by the object's surface or volume, respectively, depending on the spatial distribution of the fluorophores. Hence, sorting based on the fluorescence intensity density allows to sort objects based on the concentration of the fluorophores, e.g. for exosomes that are labelled with membrane protein markers (like CD63) or DNA/RNA markers. Similarly, sorting based on the scattering intensity density allows to sort nanometer sized objects based on their optical contrast density (and therefore based on their refractive index). This is a significant benefit, since sorting based on protein concentrations or refractive indices are inaccessible to conventional flow cytometers.

In still a further example, the method and/or use for sorting described herein may be based on the linked object's diffusivity and mobility. For instance, transmembrane proteins present in planar supported lipid bilayers (SLB) may be identified by binding to them antibody-functionalized gold nanoparticles, allowing to move transmembrane proteins of interest to a user-defined region of the SLB by applying a shear force on the gold nanoparticles. Gold nanoparticles specifically bound to the transmembrane proteins may then exhibit a diffusion coefficient that differs from that of gold nanoparticles that are non-specifically bound to single lipids. Hence, specifically bound gold nanoparticles are distinguishable from non-specifically bound gold nanoparticles based in their different diffusion coefficients and sorting based on the object's diffusivity/mobility allows to further purify the transmembrane protein by sorting out only specifically bound gold nanoparticles. As the diffusivity often depends also on the aggregation state of the transmembrane protein, one can also envision to sort transmembrane proteins based on their aggregation state using the method and/or use described herein.

The vessel such as a microfluidic channel described herein may be arranged to provide for sorting of the linked objects. For instance, the vessel such as a microfluidic channel may comprise two or more output channels into which the sorted objects may be fed. A switch may be present to facilitate sorting through the output channels.

It will be appreciated that the method and/or use of the present disclosure may be applied in many diverse technical fields and/or for various purposes. The method and/or use of the present disclosure may be used for research purposes, as a research tool, in medical applications such as diagnostics, purification of biological particles such as viruses, extracellular vesicles, nucleic acids, proteins, other biological nanoparticles etc.

The theoretical considerations underlying the present disclosure are outlined below in the context of objects in the nanometer range linked to a two-dimensional (2D) interface.

Theoretical Considerations

Linking of nm-sized objects to fluid interfaces (FIG. 1) can be used to yield diffusion coefficients that are much smaller than the corresponding bulk value (Eq. 1), allowing to slow down their movement. Since this increases the observation time, this detailed measurement of object properties (e.g. scattering or fluorescence intensity) and the manipulation the object's position (e.g. by controlling the flow within the channel) would thereby be significantly simplified. However, this reduction in diffusion coefficient is caused by the fact that the movement is now limited by the friction that acts on the parts of the linker that are embedded in the fluid interface and not by the friction that acts on the object itself. This makes it impossible to directly apply the Stokes-Einstein-relation, Eq. 1, to extract the hydrodynamic size from the diffusion coefficient, as done in for example approaches like nanoparticle tracking analysis (NTA) of the bulk diffusion of nanoscale objects. It will be shown in the following paragraphs that this apparent shortcoming (involved in linking nm-sized objects) can be circumvented, if one realizes that it is possible to analyse the object's movement independently in directions parallel and perpendicular to the flow. This allows to simultaneously determine the object's diffusion coefficient and the velocity of the flow-induced, directed movement. As the later depends on both, the object's diffusion coefficient and the hydrodynamic shear force $F_{shear}$ acting on the object, $F_{shear}$ and therefore the object's hydrodynamic size can be directly extracted.

To follow this brief reasoning consider an applied hydrodynamic shear force $F_{shear}$ that moves a linked object in the direction of the flow, generating a trajectory that is a superposition of a random and directed movement (see e.g. FIG. 2). The random movement can be characterized by the diffusion coefficient $D_{link}$ of the linked object, while the directed movement can be quantified by the object's average velocity $v_x$ in the direction of the flow (denoted as x-axis in the following, see FIG. 2). The Einstein-Smoluchowski relation connects the directed and random movement as it relates the object's mobility b, defined by $$b=v_x/F_{shear}, \qquad (2)$$

with the diffusion coefficient $D_{link}$ via $$b=D_{link}/k_B \cdot T. \qquad (3)$$

This relation can be derived from the fluctuation-dissipation-theorem, which states that those forces, which cause random fluctuations in the equilibrium state (here the random forces generated by the diffusing lipids interacting with the linker), also create a dissipation/friction if the system is subject to a non-random force (here the shear force creating a directed particle movement). Combining Eqs 2 and 3 yields $$F_{shear}=k_B \cdot T \cdot v_x/D_{link}, \qquad (4)$$

As $v_x$ and $D_{link}$ can be independently extracted from the trajectories, the hydrodynamic shear force acting on the nm-sized object can be directly calculated. Or in other words, as $v_x$ and $D_{link}$ depend both on the mobile properties of the linkers, any linker property drops out in the identification that yields Eq. 4. Consequently, the hydrodynamic shear force acting on the tracked object, which increases with the flow rate but also with the hydrodynamic size, can be directly determined from $v_x$ and $D_{link}$ using Eq. 4. Note that these equations hold as long as the diffusion coefficient of the linked object is dominated by the diffusion coefficient of the linker itself, which is fulfilled for typical linkers (diffusion coefficient below 1 μm²/s) given that the hydrodynamic radii R of the freely diffusing object is below around 200 nm (see Eq. 1).

The channel height of common microfluidic channels is usually much larger than the hydrodynamic size of interest in this approach, which for low Reynolds numbers allows to approximate the parabolic flow profile by $$v_{fluid}(z)=v_0 \cdot (z+\lambda) \qquad (5)$$

With λ denoting the slip length of the flow, which is on the order of 10 nm for flows above SLBs, and $v_0$ denoting the gradient of the velocity at the SLB. A scaling analysis shows that the drag force acting on a spherical particle in such a flow scales with the product of flow velocity at z=R (the middle of the object) times the hydrodynamic radius R, allowing to write the drag force as $$F_{shear}(R)=A \cdot \eta \cdot R \cdot v_{fluid}(R)=A \cdot \eta \cdot v_0 \cdot R \cdot (R+\lambda), \qquad (6)$$

with A denoting a prefactor that accounts for the non-homogeneous flow profile around the object. It is most convenient to determine both (a priori) unknown parameters A and λ by calibration measurements using particles of well-defined size. Note that neither A nor λ depend on object properties, which allows to relate the shear force measured using Eq. 6 with the hydrodynamic size R once A and λ have been determined using calibration measurements.

Definitions

Single particle tracking (SPT) is the observation of the motion of individual particles within a medium. The coordinates (x, y, z) over a series of time steps is referred to as a trajectory. The trajectory can be analyzed to identify modes of motion or heterogeneities in the motion such as obstacles or regions of fast transport (e.g. due to active transport or flow), in the case of random motion trajectory analysis can provide a diffusion coefficient.

A nano-sized object is intended to mean an object in the nanometer size range, such as an object having a largest cross-sectional area in the range of about 200 nm to about 400 nm.

Eq stands for equation.
fN stands for femtonewton ($10^{-15}$ N).
LMS stands for least mean square.
DOPE stands for 1,2-dioleoyl-sn-glycero-3-phosphoethanolamine.
1D stands for one-dimensional.
2D stands for two-dimensional.
μ stands for micro.
nm stands for nanometer.
CD63 is a protein that in humans is encoded by the CD63 gene.
POPC is the chemical compound 1-palmitoyl-2-oleoyl-sn-glycero-3-phosphocholine.
POPC SLB is a supported lipid bilayer made of POPC.
TEM stands for transmission electron microscopy.
DLS stands for dynamic light scattering.
DNA stands for deoxyribonucleic acid.
RNA stands for ribonucleic acid.
RAM stands for random access memory.
CPU stands for central processing unit.
SUV stands for small unilamellar vesicle.
TIRF stands for total internal reflection fluorescence.
GB stands for gigabyte.
NTA stands for nanoparticle tracking analysis.
fps stands for frames per second.

BRIEF DESCRIPTION OF THE DRAWINGS

FIG. 6a shows a histogram of the hydrodynamic force for 3 gold nanoparticle batches differing in their size distributions.

FIG. 6b shows the dependence of the hydrodynamic radius on the normalized hydrodynamic force for the 3 calibration batches shown in FIG. 6a.

The disclosure is illustrated by the following non-limitative examples

EXAMPLES SECTION

Example 1. Demonstration of 2D Size Determination of nm-Sized Objects

Figure 1:
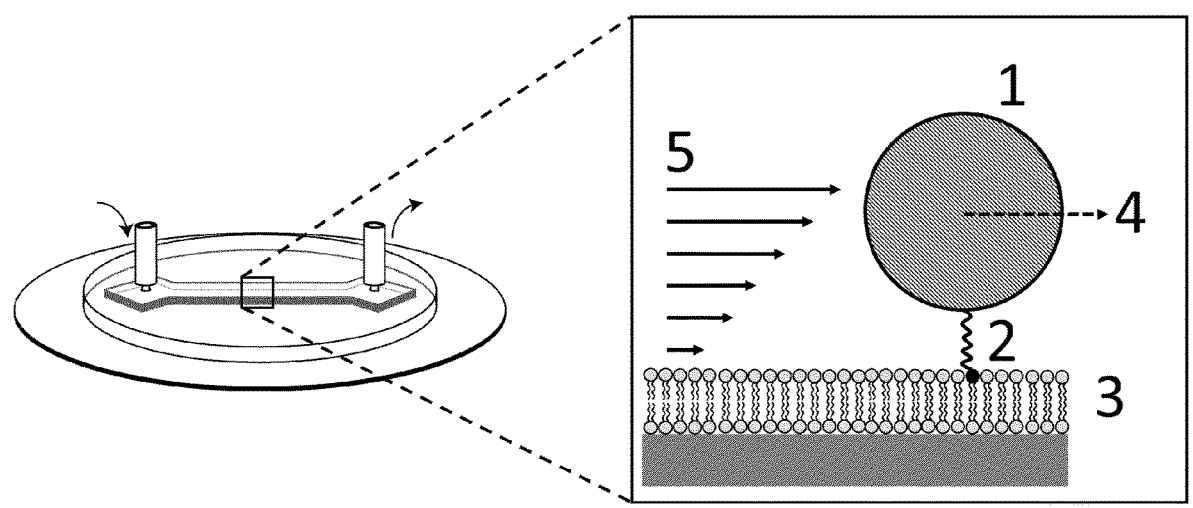
FIG. 1 shows a framework for the hydrodynamic size determination of single, nanometer sized objects. The objects (1) are linked (2) to a fluid interface (3) and moved by a hydrodynamic force (4), which is e.g. generated by application of a shear flow (5).

As a potential implementation of 2D SPT-based size extraction, a POPC SLB was formed within a microfluidic channel, followed by linking of nm-sized objects to the SLB. These objects had either a well-defined size (determined using e.g. TEM analysis) and were used for calibration measurements, or displayed a broad size distribution (e.g., vesicles), which was determined by the novel approach (using 2D SPT under flow) and compared with result of established approaches like DLS and NTA. A schematic view of the setup is given in FIG. 1.

Figure 2:
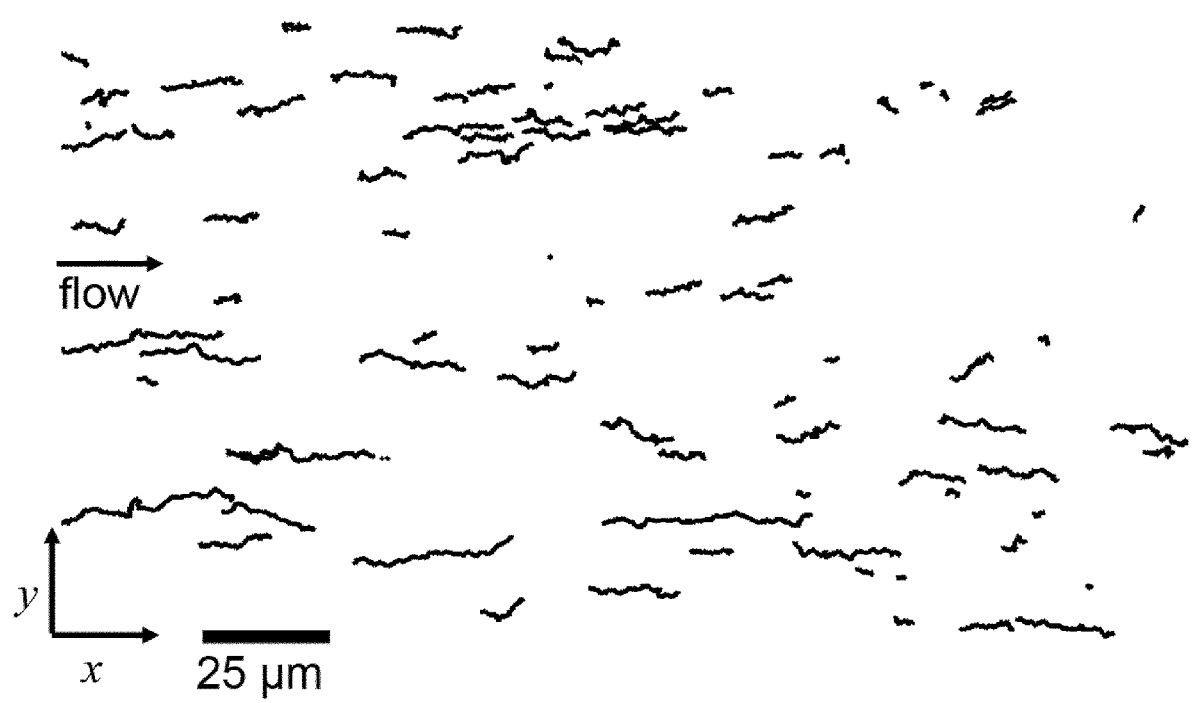
FIG. 2 shows trajectories of single gold nanoparticles that are linked to a SLB and subjected to a hydrodynamic flow.
Figure 3:
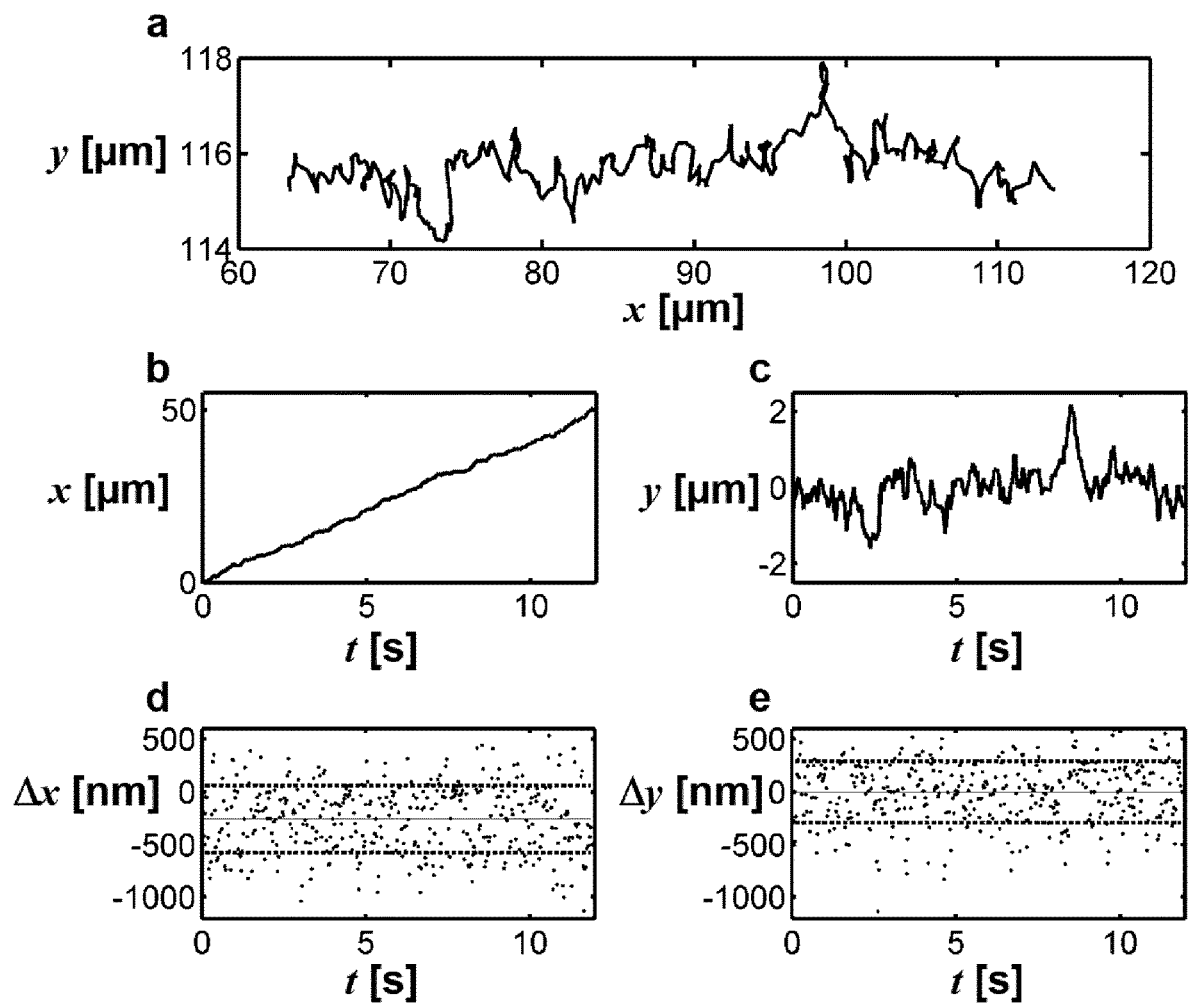
FIG. 3 shows a representative trajectory of a single gold nanoparticle. The predominantly directed movement in direction of the flow is be used to determine the velocity $v_x$ (induced by application of the hydrodynamic shear force), while 1D diffusion coefficients are extracted from the random movements in both directions.

In a first set of experiments, gold nanoparticles were used (the size distributions of which were determined using electron microscopy). The surface of the gold nanoparticles was functionalized using streptavidin, allowing to link the gold nanoparticles to biotin-conjugated lipids in the SLB. FIG. 2 shows typical trajectories of gold nanoparticles (hydrodynamic diameter 60 nm). The flow rate was adjusted such that the movement in the direction of the flow (denoted as x-axis, see FIG. 2) was dominated by a directed motion. FIG. 3a gives a representative trajectory of a single gold nanoparticle (hydrodynamic diameter 60 nm) and its decomposition into its x- and y-components, i.e., into components parallel and perpendicular to the flow direction (FIG. 3b-c). While the movement along the y-axis appeared to be purely random (FIG. 3c), as indicated by the non-directed fluctuations of the y-position displaying no obvious trend of the movement, a predominantly linear increase of the x-position was observed (FIG. 3b), which indicates presence of a directed movement along the flow direction. This directed movement was superimposed by fluctuations, however, causing minor disturbances from a perfect linear increase in x-position over time.

To investigate if this intuitive analysis holds a more stringent analysis the displacements along the x- or y-coordinates of this trajectory were plotted in FIGS. 3d and e for data points that are separated by 2 frames: $\Delta x(i)=x(i+2)-x(i)$ and $\Delta y(i)=y(i+2)-y(i)$ with i denoting the frame number. For a pure 1D diffusion, i.e., in the absence of directed movement, one expects that the average value of this coordinate difference is zero, which is observed for $\Delta y$ (FIG. 3e, thin solid line). Furthermore, the variance of $\Delta y$ is equivalent to the mean squared displacement observed in y-direction and equals therefore $2 \cdot D_y \cdot \Delta t$ (with $\Delta t$ denoting the lag time between 2 frames):

$$\mathrm{var}(\Delta y)=\langle(\Delta y-\langle\Delta y\rangle)^2\rangle=\langle\Delta y^2\rangle=2 \cdot D_y \cdot \Delta t. \quad (7)$$

Hence, calculating the variance of $\Delta y$ allows to directly extract the diffusion coefficient in the y-direction. The same holds for the x-direction with one difference: due to the directed movement, the average value of $\Delta x$ is in theory now given by $$\langle\Delta x\rangle=v_x \cdot \Delta t \quad (8)$$

and therefore non-zero (as observed for $\Delta x$; FIG. 3d, thin solid line). However, as the variance is invariant on shifting all datapoints by a constant offset (which changes only the average value), the variance of $\Delta x$ is still proportional to the diffusion coefficient in the x-direction, despite the non-zero average value:

$$\mathrm{var}(\Delta x)=\langle(\Delta x-\langle\Delta x\rangle)^2\rangle=2 \cdot D_x \cdot \Delta t. \quad (9)$$

Hence, the diffusion coefficients in x- and y-direction can be independently extracted by calculating the variance of $\Delta x$ and $\Delta y$, while taking the average value of $\Delta x$ gives a convenient way to extract $v_x$ from the trajectory (see FIG. 3d, e).

Figure 4:
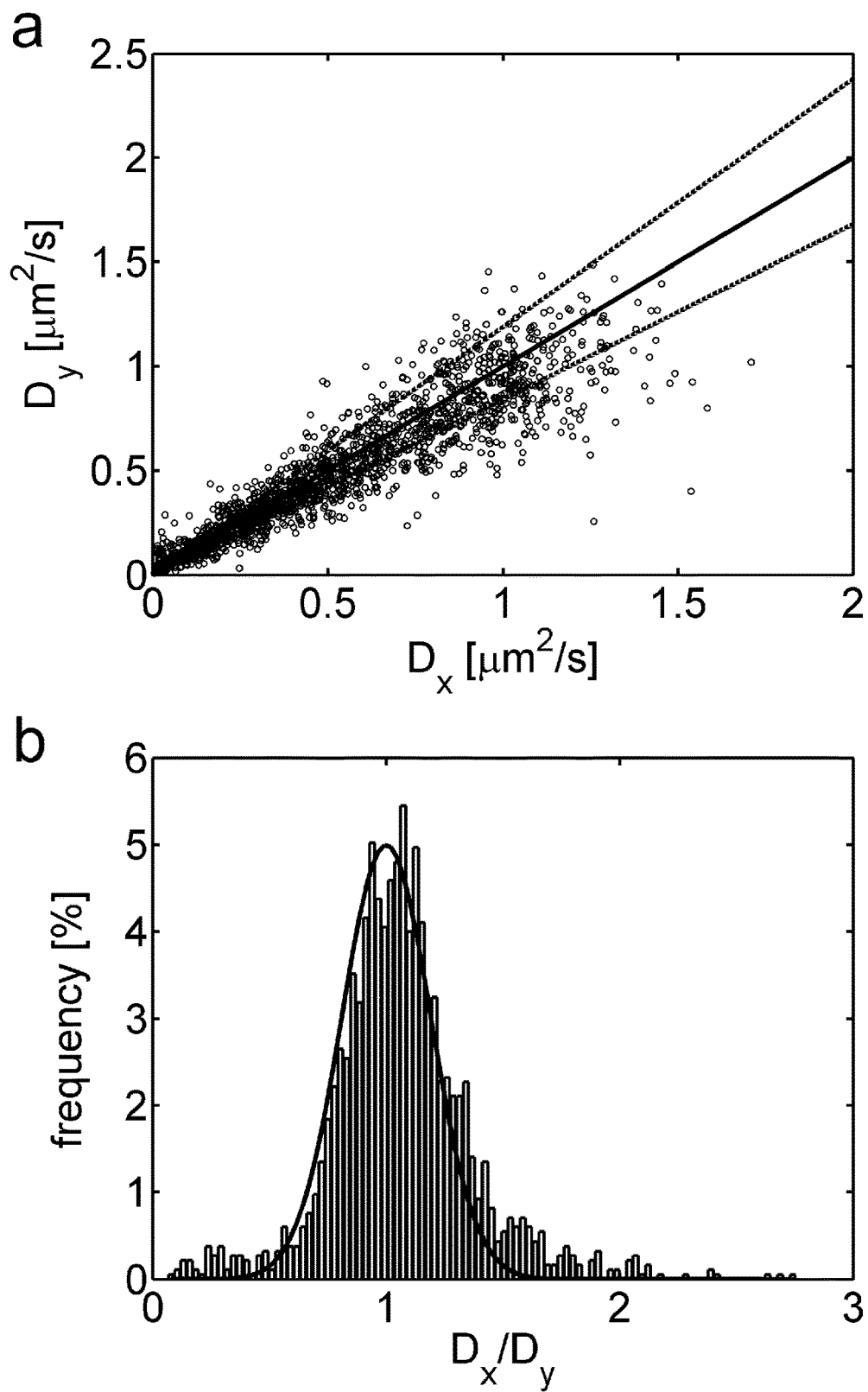
FIG. 4a shows a comparison of the 1D diffusion coefficients $D_x$ and $D_y$ of gold nanoparticles, which were extracted using the decomposition method shown in FIG. 3.
FIG. 4b shows a histogram of the ratio $D_x/D_y$ (bars), whose deviations from the expectation value 1 can be explained by the measurement resolution (solid line).

As the SLB is a 2D isotropic medium, one expects that $D_x$ and $D_y$ should be equal. This is tested in FIG. 4, which compares the extracted values for $D_x$ and $D_y$ for each tracked gold nanoparticle and shows that both diffusion coefficients are identical within experimental error (dashed lines in FIG. 4a and solid line in FIG. 4b). This demonstrates that the data extraction procedure successfully decouples the directed and the random particle movement and allows to calculate the 2D diffusion coefficient $D_{link}$ as arithmetic average of $D_x$ and $D_y$.

Figure 5:
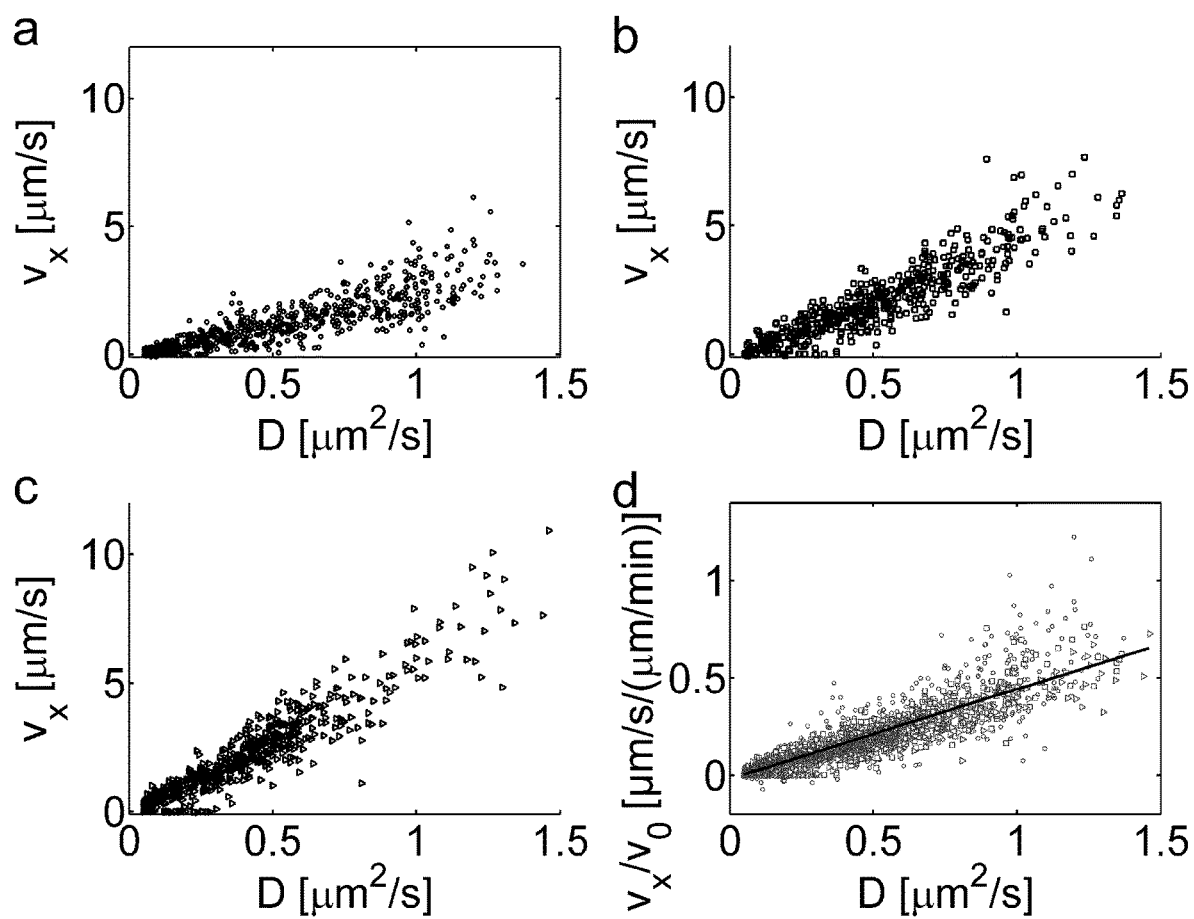
FIG. 5a, FIG. 5b and FIG. 5c show the velocity $v_x$ for gold nanoparticles versus nanoparticle diffusion coefficient D for different flow rates.
FIG. 5d show the velocity $v_x$ (after normalization by the flow rate) for gold nanoparticles versus nanoparticle diffusion coefficient D, which collapses all data points from FIGS. 5a to 5c onto a single master curve.

From Eqs 2, 3 and 6 one expects that the observed velocity $v_x$ scales linearly with the flow rate $v_0$ (of the liquid passing the channel) and the diffusion coefficient $D_{link}$, which is generally observed in the experiment (FIG. 5). Hence, after normalizing the extracted velocity $v_x$ by the applied flow rate $v_0$ (FIG. 5d), all data points collapse onto a single, linear master curve (solid line in FIG. 5d). Note that the fluctuations (noise) in FIG. 5 decrease with increasing flow rate, which is attributed to the fact that higher flow rates induce larger particle displacements between consecutive frames, which in turn increases the signal to noise ratio in the measurement of $v_x$.

Figure 6:
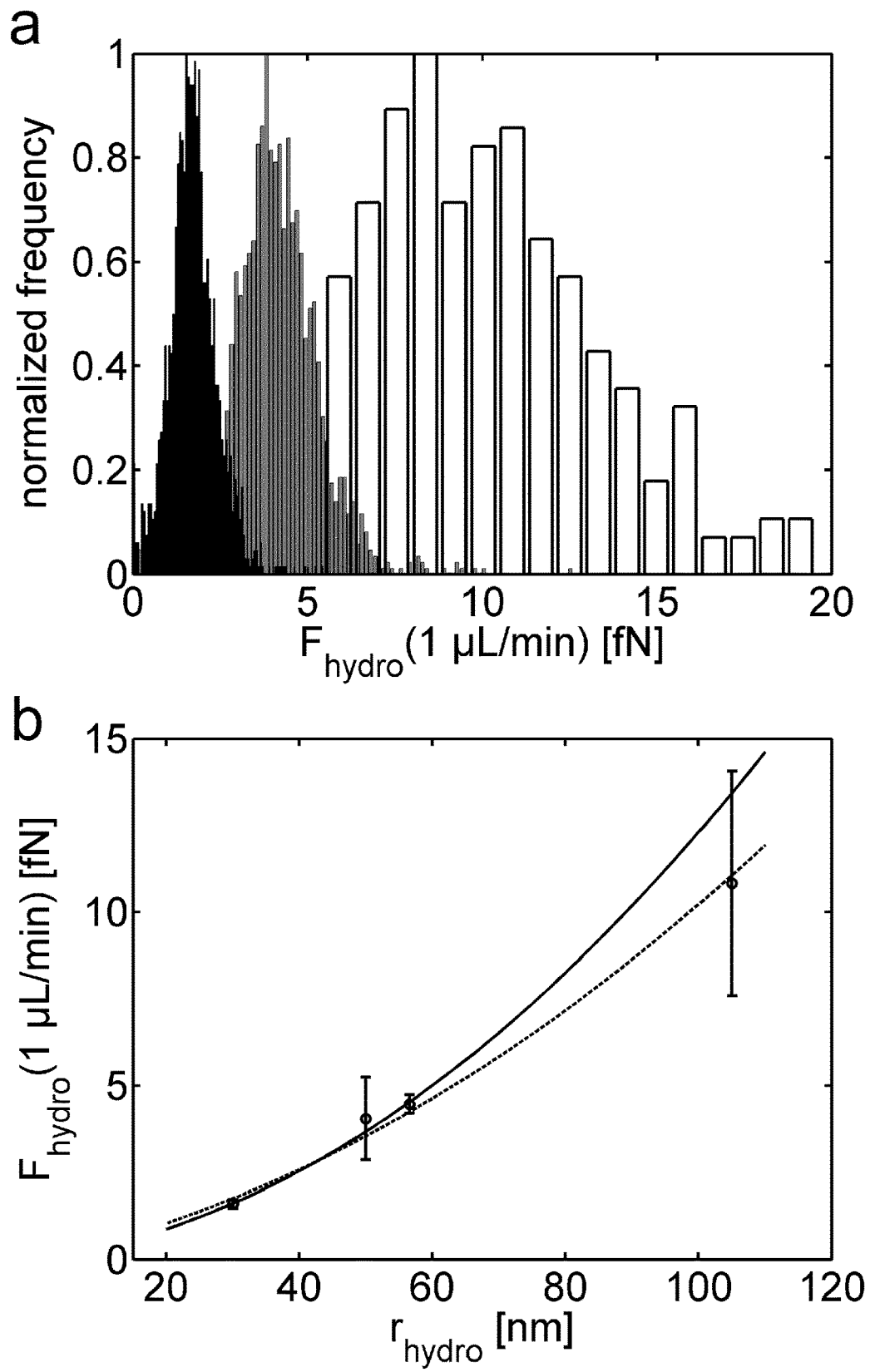
Figure 7:
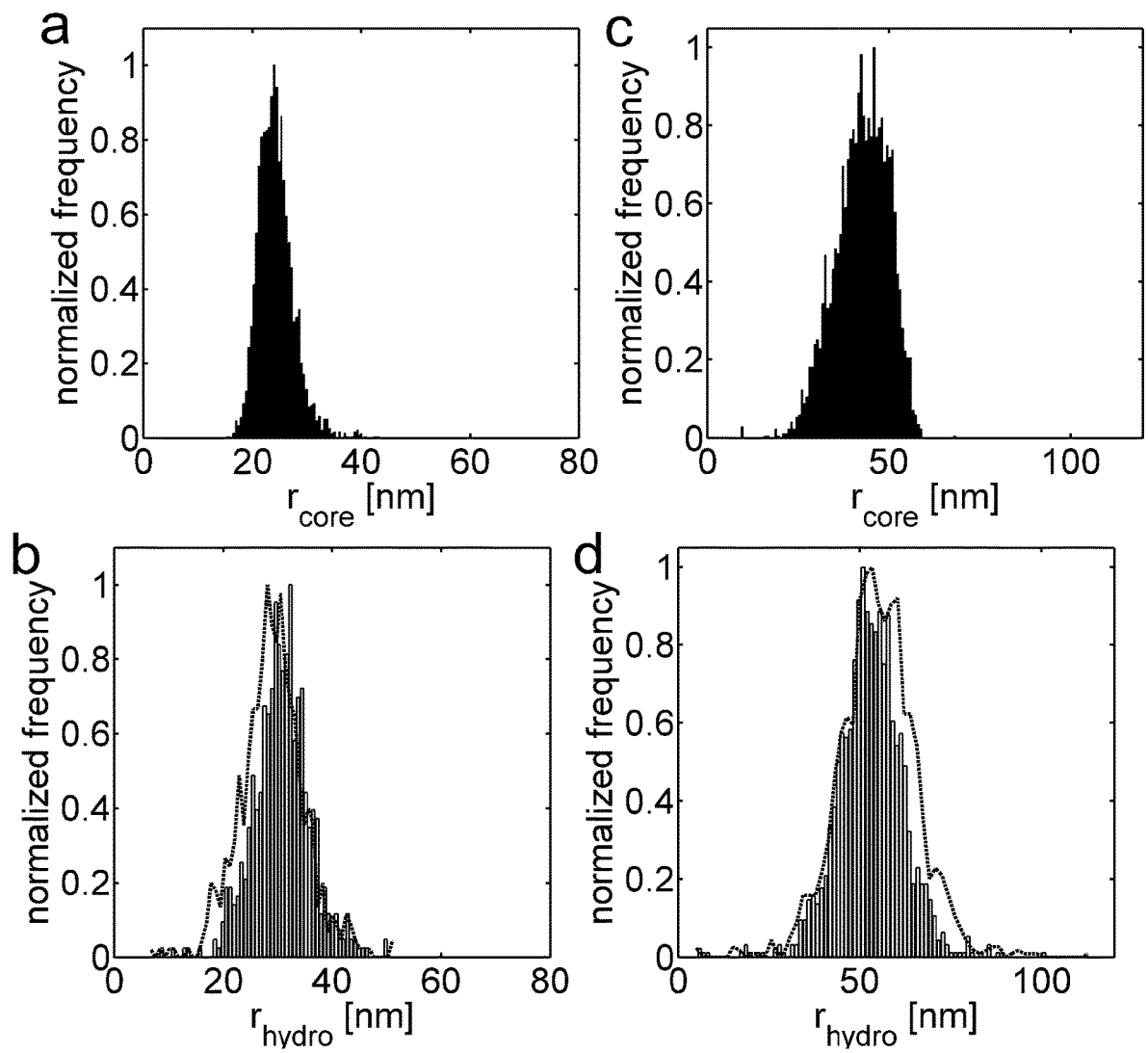
FIG. 7a and FIG. 7b shows a comparison of the size distributions of a gold nanoparticle batch extracted using electron microscopy (a) or using their 2D movement under flow (b).
FIG. 7c and FIG. 7d show a comparison of the size distributions of another gold nanoparticle batch extracted using electron microscopy (c) or using their 2D movement under flow (d).

As both the velocity in the direction of the flow, $v_x$, as well as the diffusion coefficient $D_{link}$ can be determined, application of Eq. 4 allows to directly extract the hydrodynamic force acting on each tracked nanoparticle. FIG. 6a shows histograms of the normalized hydrodynamic force measured for 60 nm, 100 nm, and 210 nm gold nanoparticles, exhibiting peaks at 1.60 fN/(μL/min) for the 60 nm, at 4.05 fN/(μL/min) for the 100 nm, and at 10.83 fN/(μL/min) for the 210 nm gold nanoparticles. These measurements allowed to determine the calibration parameters A and λ of Eq. 6 and therefore to calibrate the microfluidic channel for the determination of size distributions (FIG. 6b, lines). This is demonstrated in FIG. 7, which compares hydrodynamically-determined size distributions (as obtained by application of Eq. 6 to the observed hydrodynamic shear forces) with the one obtained by electron microscopy imaging of gold nanoparticles samples. Both methods yield essentially the same distributions if one takes a shift of 5 nm into account, which is caused by a PEG corona formed on the nanoparticle surface (and which is not resolvable in the TEM images). Moreover, the hydrodynamically-determined size distributions were extracted using slip lengths of 24.4 nm (bars in FIGS. 7b and 7d; motivated by the weighted LMS-fit in FIG. 6b) and 64.5 nm (dashed lines in FIGS. 7b and 7d; motivated by the LMS-fit in FIG. 6b), showing that changes in the slip length have only little effect on the size extraction for hydrodynamic diameter below 100 nm.

Figure 8:
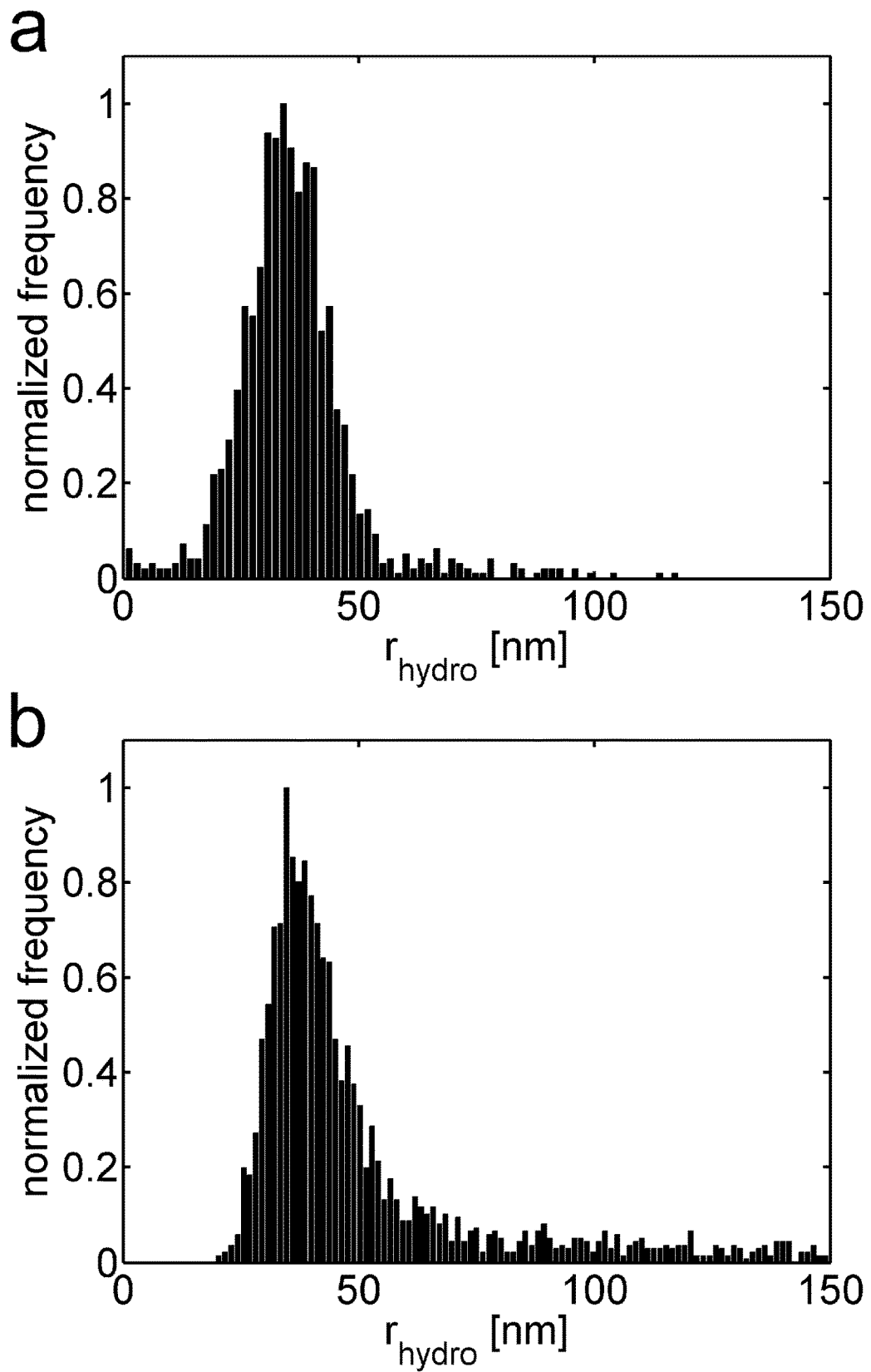
FIG. 8a shows the size distribution of a SUV sample as extracted from the 2D movement under flow.
FIG. 8b shows the size distribution of the same SUV sample (as in FIG. 8a) as extracted using NTA.
Figure 9:
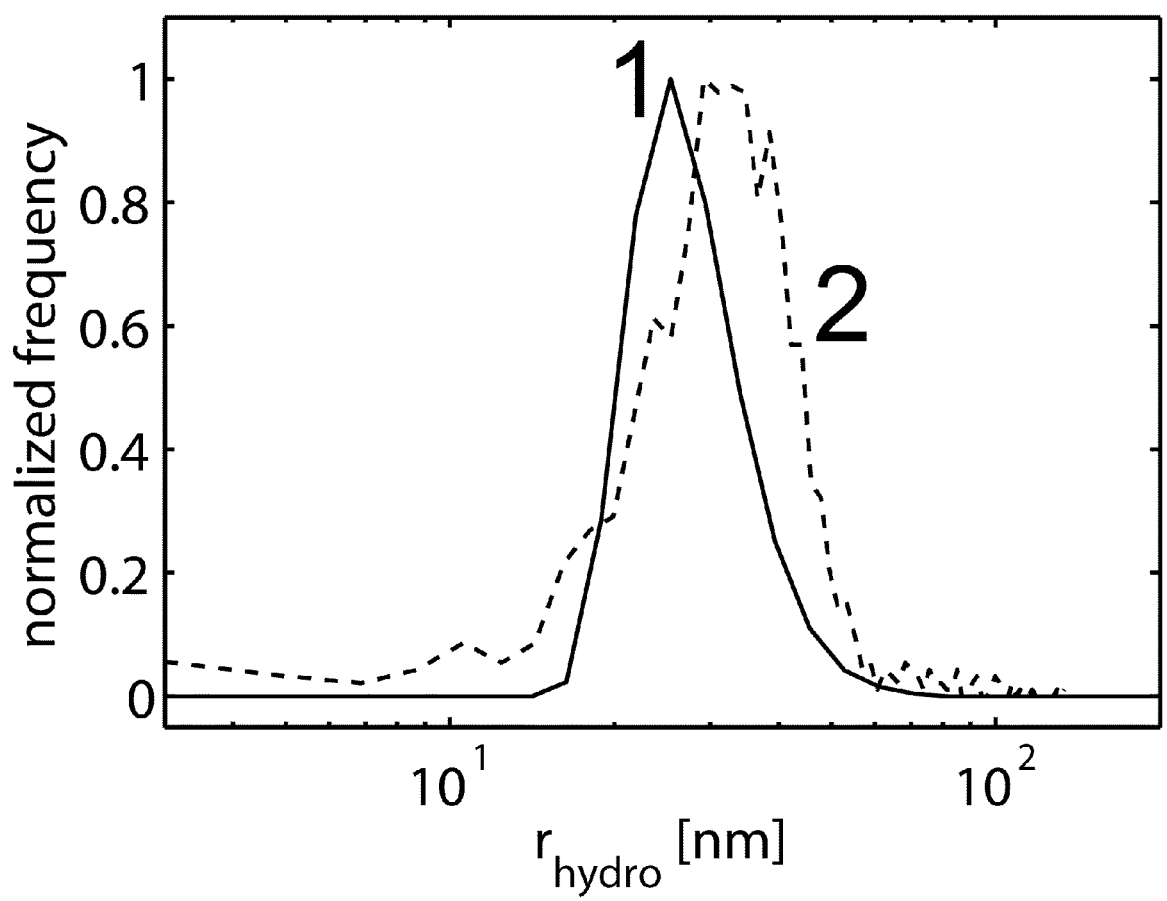
FIG. 9 compares the size distributions of a SUV sample as extracted using DLS (1) or the 2D movement under flow (2).

As a potential application, the size distribution of liposomes was determined using the novel approach. The liposomes (fluorescently labelled by incorporation of lissamine rhodamine-conjugated DOPE) were linked to the SLB using cholesterol-equipped DNA-tethers as recently described in The Journal of Physical Chemistry B, 109(19), 9773-9779 and ChemPhysChem, 11(5), 1011-1017. FIG. 8 and FIG. 9 compare the hydrodynamically-determined size distributions of the liposomes (FIG. 8a and curve 2 in FIG. 9) with the size distributions derived using NTA (FIG. 8b) or DLS (curve 1 in FIG. 9), indicating good agreement of the complementary approaches. This comparison also shows that liposomes with hydrodynamic radii <25 nm, which are practically unresolved in the NTA size distribution (FIG. 8b) are well resolved in the hydrodynamically-determined size distribution (FIG. 8a). The existence of this fraction is confirmed by the DLS measurement (FIG. 9).

Example 2. Demonstration of Real Time Tracking Analysis

Sorting obviously requires the full tracking analysis to be done in real time, i.e., the tracking analysis must be capable to analyse the same number of frames the microscope is able to write per time unit. This is so because otherwise the tracked objects will sooner or later have passed the field of view of the microscope before their properties have been determined by the analysis, making a sorting based on their properties impossible.

In order not to affect the acquisition performance of the software used to record and store the imaging data, it was decided to split the whole tracking analysis into distinct tasks, which are distributed among the available nodes of the CPU. This ensures that each analysis task does not consume more CPU resources than the amount corresponding to a single node, which avoids crosstalk in the CPU usage (during the course of the data analysis) between the nodes hosting the image recording and tracking analysis software, respectively. Or in other words, increases in CPU consumption during the tracking analysis cannot feed through to the recording software, which would cause a negative effect on the image acquisition rate.

The tracking analysis was divided into 5 distinct tasks (FIG. 9): 1. picking: detection and localization (with pixel accuracy) of objects within the images, 2. linking of detected objects between adjacent frames to build up the tracks, 3. refining the localization of the detected objects with sub-pixel accuracy based on a centroid algorithm, 4. if of interest: extraction of the integrated scattering or fluorescence intensity of the detected objects, and 5. interlacing all these distinct data streams into a complete tracking analysis, which is then used to steer the flow through the microfluidic channel. The analysis architecture allows further splitting of the data analysis queues (thereby increasing the total analysis throughput) by running multiple copies of these fundamental tasks, each analysing distinct data heaps. This makes up-scaling of the architecture easy, if the hosting computer offers sufficient nodes and data transfer rates. Additionally, it is possible to sort even those objects, whose track coordinates have only partially refined but already offer sufficiently high accuracy in the determination of properties of interest, as soon as their linking data is available.

The performance of the real time particle tracking analysis was tested on liposomes that were linked to a SLB as described in above. A single computer was used to control the TIRF microscope, to record the SPT movies and to analyse the recorded movies, allowing to test if the CPU usage remains within the assigned limits, i.e. to ensure that a high CPU usage of the analysis nodes does not feed through to the nodes controlling the TIRF microscope. The computer was equipped with a 3.2 GHz Intel i7-3930K CPU supplying 12 virtual nodes (6 hyperthreadable, physical cores that can be split in 2 distinct, virtual nodes each) with 32 GB RAM.

Figure 10:
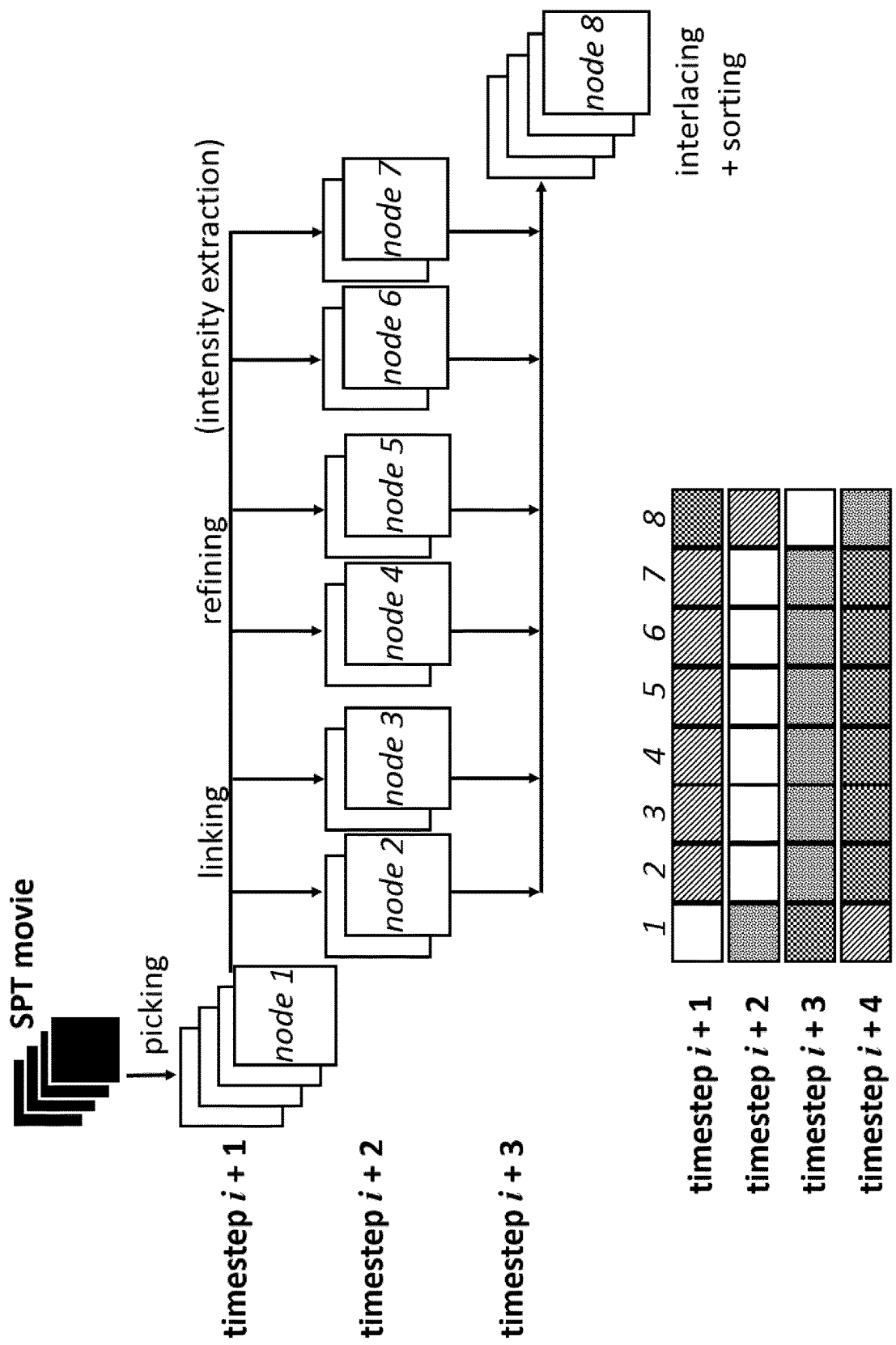
FIG. 10 shows a flow chart of real time SPT analysis.
Figure 11:
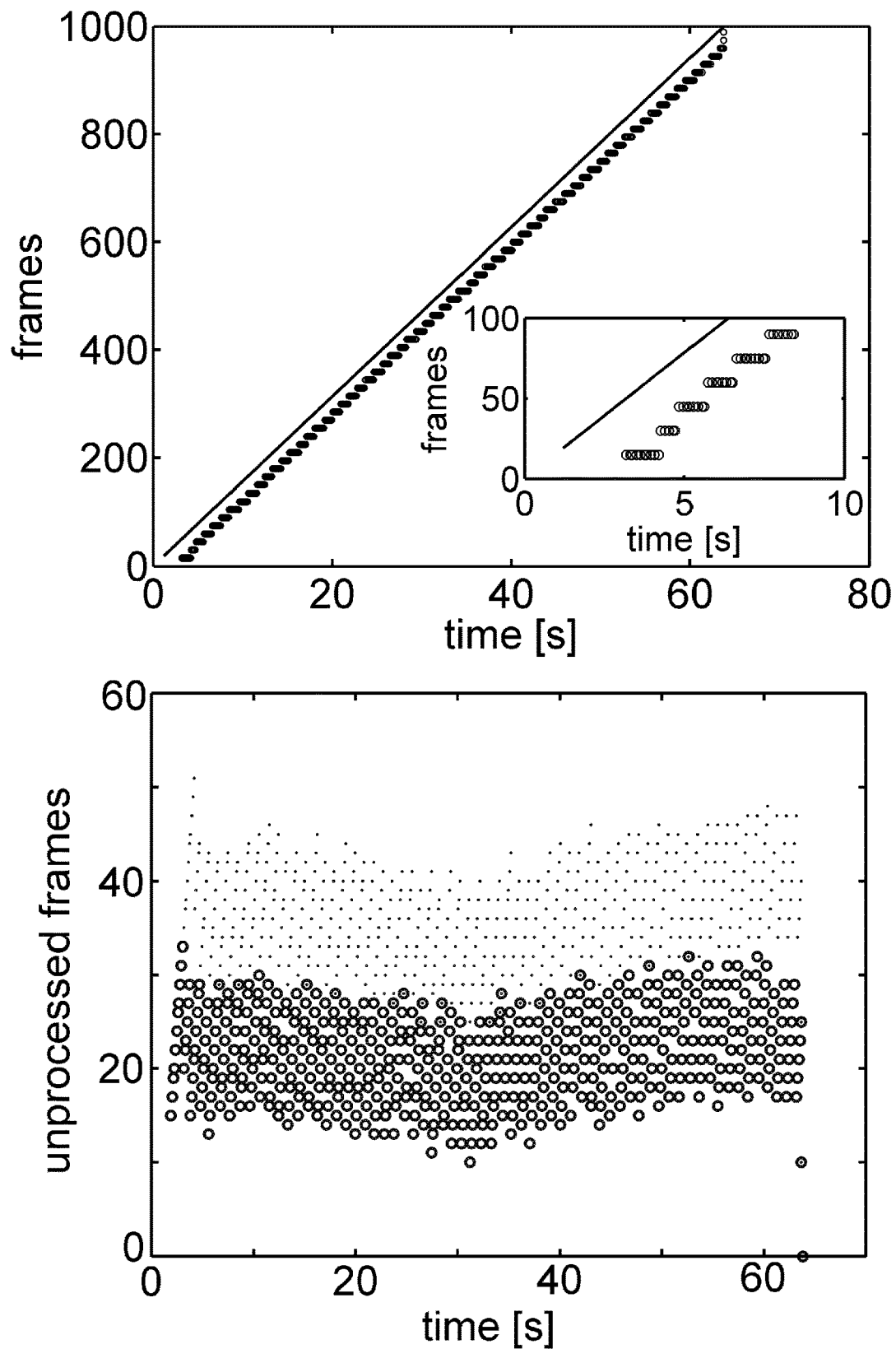
FIG. 11 shows a demonstration of real time tracking analysis.

For SPT movies containing 1280×1024 pixels and less than 100 trackable objects, the current implementation reached the following data throughput per node: picking 30 fps, linking 15 fps, refining 12 fps. Using 1 picking node, 2 linking nodes and 2 refinement nodes ensured a constant data throughput of 20 fps, without affecting the acquisition rate of the nodes controlling the microscope (FIG. 10). To push beyond the limit of 25 fps, which is often referred to as real time imaging, it is necessary to split the data streams once more, i.e. to use 1 picking node, 3 linking nodes and 3 refinement node, requiring 4 physical CPU cores, or to reduce the number of tracked objects.

Example 3. Sorting of nm-Sized Objects Linked to a Fluid Interface

Figure 12:
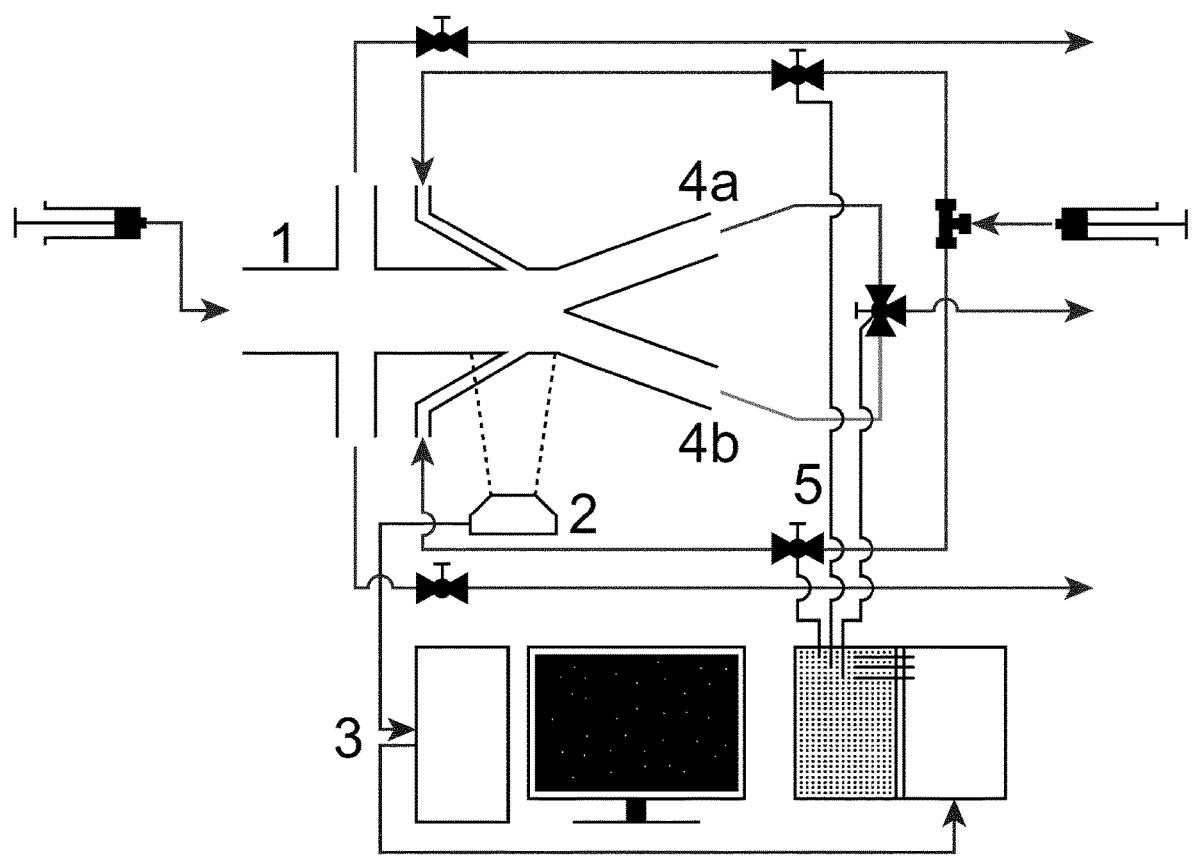
FIG. 12 shows a framework for the size determination and sorting of single, nanometer sized objects.

The present disclosure enables sorting of nm-sized objects using the following procedure:

1. The objects are linked to a fluid interface (e.g., located at a wall of a microfluidic channel; 1 in FIG. 12), while their motion is followed in real time using SPT (e.g., using microscopic imaging, 2 in FIG. 12, in connection with real time data analysis, 3 in FIG. 12). Exemplary implementations of this step are disclosed in the sections "Example 1" and "Example 2".
2. The SPT analysis allows to extract object properties of interest, for example the refractive index contrast, and the scattering or fluorescence intensity of each tracked object. Suitable analysis procedures have been describe in the literature. In addition to these established procedures, the analysis approach introduced in section "Theoretical considerations", allows to derive the hydrodynamic size of the objects after linking to a fluid interface. This enables sorting of nm-sized objects based on their hydrodynamic size, which is of special interest for sorting of e.g. exosomes, when combined with parallel identification of protein expression levels or incorporated DNA or RNA (e.g., by measuring the fluorescence intensity of a certain marker relative to the hydrodynamic exosome size).
3. Finally, if an object that fulfils a given sorting criteria reaches the sorting area of the microfluidic channel, the flow between the 2 output channels (4a and 4b in FIG. 12) is switched by a computer controlled valve system (5 in FIG. 12), initiating the actual sorting process. Once the object was successfully moved into the "sorting output channel", the valves are switched back and the original flow is restored.

REFERENCES

WO 03/093801
WO 2013/021185
US 2004/0169903
US 2014/0333935
Langmuir, Vol. 2006, 22, pp. 2384-2391
Journal of Physical Chemistry B, 109(19), 9773-9779
Langmuir, Vol. 22(13), pp. 5682-5689
Journal of extracellular vesicles, 2015, Vol. 4, Pospichalova et al.
The Journal of Physical Chemistry B, 109(19), pp. 9773-9779
ChemPhysChem, 11(5), pp. 1011-1017

The invention claimed is:

1. A method for determining a hydrodynamic size of an object, said method comprising the steps of:
providing a substrate having a surface that defines a two-dimensional fluid interface,
linking said object to said fluid interface thereby providing a linked object, whereby a movement of said linked object is restricted to a two-dimensional plane extending in a x direction and a y direction by virtue of being linked to said fluid interface,
providing a hydrodynamic shear force that acts on said linked object by inducing a fluid flow,
tracking the movement of said linked object,
determining, from the tracked movement, said object's diffusion coefficient and said object's velocity in the direction of the flow, wherein the movement of said object is analyzed independently in a direction parallel or perpendicular, or a combination thereof to the induced flow,
determining said hydrodynamic shear force acting on said object from a relationship between said determined diffusion coefficient and said determined velocity, and determining said hydrodynamic size of said linked object from a relationship between said determined hydrodynamic shear force and the fluid flow rate.

2. A method according to claim 1, wherein the hydrodynamic shear force is combined with at least one additional force being an electrophoretic force, osmotic force, magnetic force, or convection, or a combination thereof.

3. A method according to claim 1, wherein said object is a nano-sized object having a maximum cross-sectional dimension within the range of from 1 nm to 500 nm.

4. A method according to claim 1, wherein the object comprises of a metal, an organic material, an inorganic material, a biological material and any combinations thereof.

5. A method according to claim 4, wherein the object comprises a biological material, wherein the biological material is selected from the group consisting of proteins, viruses, exosomes, lipid assemblies, nucleic acids, and extracellular vesicles, and any combinations thereof.

6. A method according to claim 1, wherein said method involves sorting of a plurality said objects according to their hydrodynamic size.

7. A method according to claim 1, wherein said tracking is carried out in real time.

8. A method according to claim 1, wherein the fluid interface is substantially planar or substantially curved.

9. A method according to claim 1, wherein said fluid interface is comprised within a microfluidic channel or a capillary.

10. A method according to claim 1, wherein the fluid interface is a film, a monolayer, a bilayer, a cell membrane, an air water interface, or an oil water interface.

11. A method according to claim 1, wherein the fluid interface is a supported lipid bilayer.

12. A method according to claim 1, wherein said fluid interface is located on a wall.

13. A method according to claim 1, wherein said method comprises the step of detecting said object.

14. A method according to claim 13, wherein said step of detecting said object involves measurement of fluorescence, refractive index and/or scattering intensity of said object.

15. A method of using a system for determining the hydrodynamic size of an object, said system comprising: a container, a substrate having a surface within the container, wherein the surface of the substrate defines a two-dimensional fluid interface; means for flowing a fluid across the fluid interface to provide a hydrodynamic shear force that acts on an object linked to said fluid interface, and means for tracking an object linked to said fluid interface, the method comprising:

linking said object to said fluid interface thereby providing a linked object, whereby the movement of said linked object is restricted to a two-dimensional plane extending in a x direction and a y direction by virtue of being linked to said fluid interface, providing the hydrodynamic shear force that acts on said linked object by inducing a fluid flow, tracking the movement of said linked object, determining, from the tracked movement, said object's diffusion coefficient and said object's velocity in the direction of the flow, wherein the movement of said object is analyzed independently in a direction parallel or perpendicular, or a combination thereof to the induced flow, determining said hydrodynamic shear force acting on said object from a relationship between said determined diffusion coefficient and said determined velocity, and determining said hydrodynamic size of said linked object from a relationship between said determined hydrodynamic shear force and the fluid flow rate.

16. The method of claim 15, wherein the container comprises a microfluidic channel.

* * * * *